United States Patent [19]
Ohsaki et al.

[11] Patent Number: 5,199,961
[45] Date of Patent: Apr. 6, 1993

[54] APPARATUS FOR CATALYTIC REACTION

[75] Inventors: Kozo Ohsaki; Akio Naito; Kazumi Shima, all of Chiba, Japan

[73] Assignee: Toyo Engineering Corporation, Tokyo, Japan

[21] Appl. No.: 748,940

[22] Filed: Aug. 23, 1991

[30] Foreign Application Priority Data

Aug. 28, 1990 [JP]  Japan .................................. 2-225871

[51] Int. Cl.$^5$ ................................................ B01J 8/06
[52] U.S. Cl. ...................................... 48/94; 48/127.9; 422/197; 422/202; 422/204; 422/205
[58] Field of Search ............... 422/197, 202, 203, 204, 422/205, 196, 211, 312; 48/94, 127.9; 429/17, 19

[56]  References Cited
U.S. PATENT DOCUMENTS

| | | | |
|---|---|---|---|
| 3,230,052 | 1/1966 | Lee et al. | 422/204 |
| 4,661,323 | 4/1987 | Oleson | 422/197 |
| 4,714,593 | 12/1987 | Naito et al. | 422/197 |
| 4,740,357 | 4/1988 | Buswell et al. | 422/197 |
| 4,810,472 | 3/1989 | Andrew et al. | 422/197 |

FOREIGN PATENT DOCUMENTS 2226775  7/1990  United Kingdom .

Primary Examiner—Peter Kratz
Attorney, Agent, or Firm—Flynn, Thiel, Boutell & Tanis

[57]  ABSTRACT

An apparatus for catalytic reaction containing a heating chamber having a hearth, side wall(s) and a roof, and an inlet and outlet for a heat source gas; a substantially vertically mounted concentric double cylindrical tubular reactor mounted in said roof and protruding into the space within said heating chamber; a gas-permeable dividing means which divides the space within the heating chamber into an upper convection heat transfer space and a lower radiant heat transfer space is useful in steam reforming and similar processes.

8 Claims, 4 Drawing Sheets

APPARATUS FOR CATALYTIC REACTION

The present invention relates to an apparatus for catalytic reaction. More particularly, the present invention is concerned with an apparatus having a high heat recovery efficiency or a lower energy consumption and suitable for use in an endothermic reaction such as steam reforming of hydrocarbon.

In a reactor as an apparatus for steam reforming or the like in a hydrogen generator wherein a catalyst is packed therein and a reaction is conducted at a high temperature while receiving heat from the outside of the apparatus, a proposal has been made on a method wherein a concentric double tube is adopted as a reaction tube for the purpose of conducting heat exchange with a high efficiency and, at the same time, realizing a reduction in the size of equipment, a catalyst is packed in an annular space defined by an inner tube wall and an outer tube wall, and only a high-temperature reacted gas is passed through the inside of the inner tube. In this method, the adoption of a double tube provides the following advantages. The reacted gas which has passed through the catalyst layer provided in a high temperature region gives its sensible heat to the catalyst layer through the inner tube wall while passing through the inside of the inner tube. Further, since the reacted gas has a lowered temperature at the outlet of the steam reformer, it becomes possible to reduce the capacity of heat recovery equipment comprising a group of heat exchangers provided downstream of the steam reformer and, at the same time, the heat dissipation becomes small because the outlet gas temperature is low.

In order to further improve the heat utilization efficiency of the above-described double tubular reactor, for example, Japanese patent application Publication No. A-2-160035 (Published Jun. 20, 1990) discloses a reactor wherein a horizontal gas-permeable porous material is provided on the upper part of the radiant space for the purpose of effectively utilizing the radiant heat and a heat transfer means, such as a wave-shaped plate fin heat exchanger, is provided on a necessary portion of the inner tube and/or outer tube of the double tube, in order to enlarge the heat transfer area to make the best use of the sensible heat of reacted gas. In order to utilize the radiant heat, use has been made of radiation from a flame of a heat source, such as a burner, and radiation from a gas-permeable ceramic plate provided on the upper part of the tube at right angles with the tube.

In the above-described tube wherein use is made of a heat recovery means and a gas-permeable wall, a sufficient effect is not always attained through an increase in the capacity of the apparatus. That is, in an apparatus for steam reforming or the like, when the capacity of the apparatus is increased, it is necessary to increase the amount of catalyst for the reaction.

In order to increase the amount of the catalyst, the following methods are used alone or in combination thereof.

1. The dimension (diameter) of the reforming tube is increased.
2. The dimension (length) of the reforming tube is increased.
3. The number of the reforming tubes is increased.

In order to increase the number of the reforming tubes, attention should be paid to the relative position between the tubes and a burner as the heat source. Specifically, the tubes should be provided in such a manner that the radiant heat from the burner is equally supplied to individual tubes, a direct contact of the tubes with a flame of the burner is prevented and the formation of a low-temperature portion through the formation of a shadow at part of the tubes due to uneven radiation and further the formation of a hot spot due to abnormal heat supply at other parts are prevented.

In the Japanese Patent Application Publication No. A-2-160035 use is made of a gas-permeable plate comprising a gas-permeable ceramic or the like for the purpose of effectively utilizing the radiant heat. In FIG. 1 of the Japanese Patent Application, the gas-permeable plate is disposed at right angles to the axis of the reforming tube, that is, horizontal to the vertical reforming tube. The relationship in heat transfer between the radiant heat source and the reforming tube as a heat receiving side provided at right angles with the radiant heat source is not so effective. In other words, the angular relationship (shape factor) regarding radiant heat transfer between the two surfaces facing each other is not good.

An object of the present invention is to avoid the above-described problems and to provide means capable of reducing the size of the apparatus as a whole even when the capacity of the apparatus is increased by virtue of an improvement in the heat exchange efficiency in a simple construction.

In the present invention, use is made of a reforming tube having a heat recovery means as described in the Japanese Patent Application No. A-2-160035, the number of the reforming tubes is increased to cope with an increase in the capacity of the apparatus, the reforming tubes are linearly provided in a row, a radiant heat equalizing plate is provided so as to sandwich the row of the tubes, a high-temperature gas is blown onto the heat equalizing plate from the lower part thereof, and an upper gas-permeable plate is obliquely provided, thereby equalizing and enhancing the radiant heat transfer.

In order to improve the angular relationship (shape factor) regarding radiant heat transfer between the two surfaces facing each other, the gas-permeable plate is obliquely provided so as to face the reforming tubes at the lower side thereof. Further, the oblique provision of this plate causes the area for absorbing and radiating heat and, at the same time, the gas passing area to be increased, so that the heat of a high-temperature waste gas can be effectively recovered and given to the lower part of the reforming tube which requires a large amount of heat, and further, the flow resistance can be reduced.

Accordingly, the present invention provides an apparatus for catalytic reaction comprising a heating chamber having a hearth, side wall(s) and a roof, and an inlet and outlet for a heat source gas; a substantially vertically mounted concentric double cylindrical tubular reactor mounted in said roof and protruding into the space within said heating chamber; a gas-permeable dividing means which divides the space within the heating chamber into an upper convection heat transfer space and a lower radiant heat transfer space and disposed such that a lower portion of the protruding section of the tubular reactor is within the radiant heat transfer space and an upper portion of the protruding section of the tubular reactor is within the convection heat transfer space; said tubular reactor having an outer cylindrical tube and a concentric inner tube, the lower end of said outer tube being closed at its upper end and having an inlet for raw material gas communicating with a annular space defined by said outer and inner tubes for packing with catalyst and communicating with the lower and open end of said inner tube, the upper end of said inner tube being closed from said outer tube and communicating with an outlet for said reactor; characterised in that a heat recovery means is disposed in the upper end of said inner tube, which heat recovery means protrudes inwardly from the internal surface of said inner tube, in that said outlet from said heating chamber comprises an annular opening defined by the outer surface of the outer tube and the surface of a opening in the roof through which the reactor protrudes, in that a heat recovery means is disposed in said annular opening, in that the gas-permeable dividing means extends outwardly from the outer surface of said outer tube and obliquely downwardly to meet the side wall(s) of said heating chamber and in that a heat equalizing layer extends from the outer periphery of the gas-permeable dividing means substantially vertically downwardly to the hearth and the inlet(s) for said heat source gas are disposed in the hearth such as to direct said heat source gas onto the inner surface of said heat equalizing layer.

In one embodiment, the present invention provides an apparatus for catalytic reaction, comprising a substantially vertical concentric double cylindrical tubular reactor provided at its upper end with an inlet and an outlet for a reaction fluid, wherein the lower end of an outer cylindrical tube is closed, the lower end side other than the part on the upper end side of the double tube protrudes within a heating vessel, the reaction fluid is passed from said inlet through an annular space defined by an outer cylindrical tube and an inner cylindrical tube and packed with a catalyst, inverted at the lower end of the reactor and passed through an internal space of said inner cylindrical tube and led to the outlet, a gas serving as a heat source is passed along the outside of the outer cylindrical tube from the lower end towards the upper end, a heat recovery means is provided so as to protrude from the internal surface of said inner cylindrical tube, an outlet for the heat source gas from the heating vessel is an annular opening which is concentric with a double tube located between an outer wall of said outer cylindrical tube located near the upper end of said double tube and an upper end side wall as the heating vessel wall at a portion from which said double tube protrudes, said heating gas outlet is provided with a heat recovery means protruding from the outer surface of the outer cylindrical tube, the space within the heating vessel is divided by a gas-permeable plate from which the lower end of the double tube protrudes opposite to the side wall side of the upper end into a radiant heat transfer space located on the side of the lower end of the double tube and a convection heat transfer space on the side of the side wall of the upper end, the gas-permeable plate faces the double tube obliquely on the side of the radiant heat transfer space, a substantially vertical heat equalizing plate is provided within the radiant heat transfer space so as to face the double tube, and a heat source gas blowing means is provided so as to blow a high-temperature heat source gas onto the heat equalizing plate from the lower part towards the upper part of the heat equalizing plate.

Embodiments of the present invention will now be described in more detail with reference to the accompanying drawings, in which.

In the Figures of the drawings like numerals denote like parts.

Figure 1:
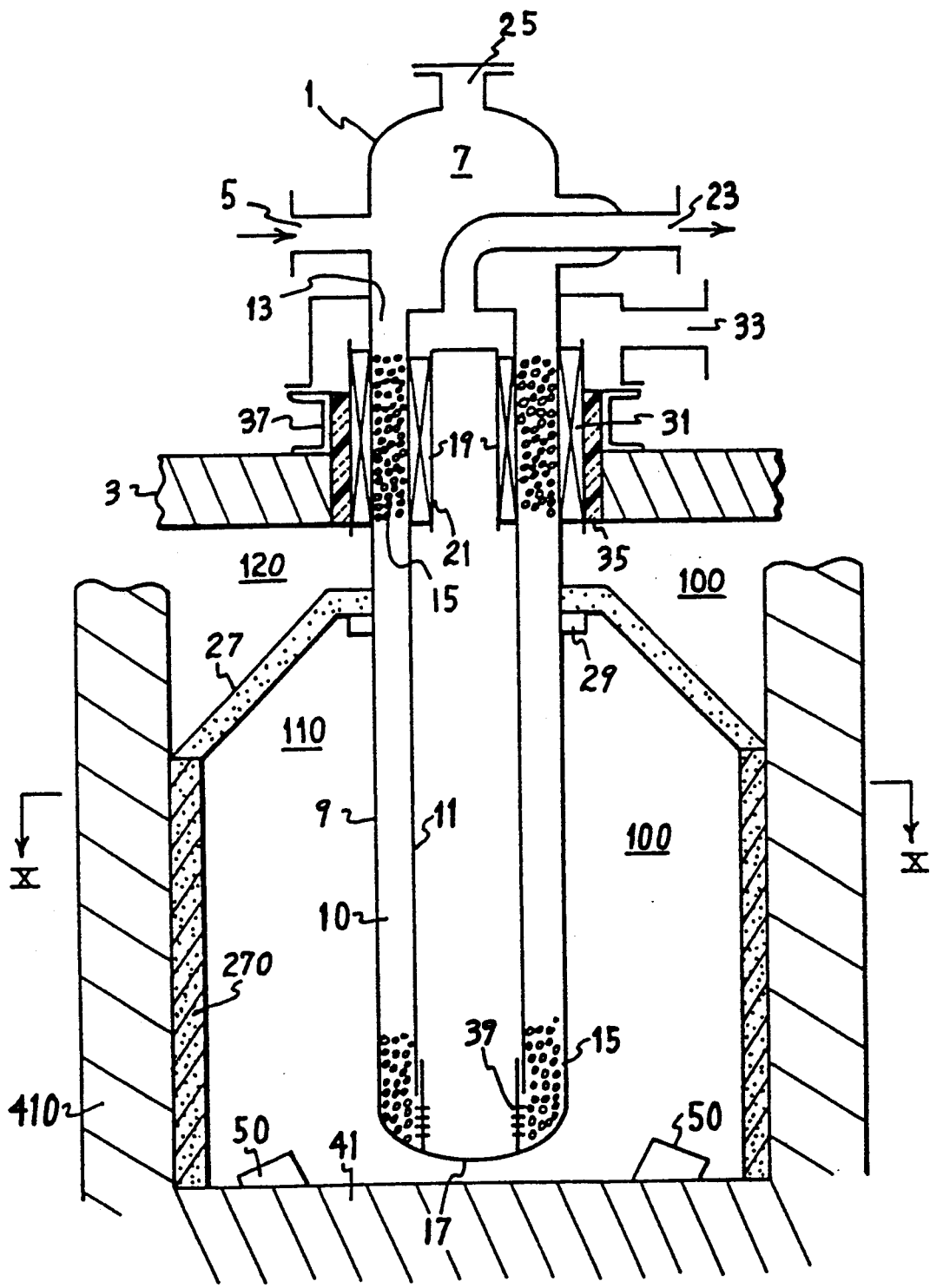
FIG. 1 is a longitudinal sectional view of the reactor of the present invention provided in a heating furnace.

An apparatus 1 for catalytic reaction is fixed to an upper wall (ceiling) 3. In this embodiment, a steam-reformable hydrocarbon and steam are fed as the raw materials (feedstock) in the form of a mixture in the presence of a suitable catalyst, and the mixture passes through a catalyst layer while receiving heat from the heating furnace, thereby causing the hydrocarbon to be converted into hydrogen and carbon dioxide.

A raw material gas mixture (feedstock) is fed from an inlet 5 through an internal space 7 located in an upper cap portion into an annular space 13 defined by an outer cylindrical tube 9 and an inner cylindrical tube 11. A reforming catalyst 15 is packed in the annular space (in the drawing, a portion other than the upper and lower portions, that is, an intermediate portion is omitted). The upper portion of the catalyst serves to preheat the raw material gas, while the lower portion participates in the reaction.

The raw material gas passes through the catalyst layer to cause the gas to be reformed and then reaches the bottom 17 of the reaction tube. At the bottom, the direction of flow of the gas (which is now a reacted gas) is reversed so as to flow upward through the inside of the inner cylindrical tube. Corresponding to the portion serving to preheat the raw material gas, a plate fin 19 parallel to the passage is integrally joined or bonded metallurgically to the surface of the inner tube wall of the inner cylindrical tube. Welding and brazing are suitable methods for integrally metallurgically joining a metallic plate fin having a good heat conductivity to the surface of the inner tube wall. The reason why metallurgically integral joining is adopted is that it is superior in terms of heat transfer to simple surface contact. In order to increase the heat transfer area of the fin and realize a remarkable reduction in the pressure loss, use may be made of a method wherein a thin sheet or plate of stainless steel is bent in a wave-shaped form and then integrally joined to the inner surface of the inner tube by means of brazing or welding and, at the same time, a dummy shell 21 which may comprise the same material as that of the plate fin is provided. In this case, vacuum brazing is suitable because the plate is thin. The use of the thin plate fin having a wave-shaped fin is suitable for the present invention aiming at improving the heat exchange efficiency with a low pressure loss.

Any one end, preferably the upper end of the dummy shell 21 is closed, and the reacted gas is caused to flow through only the plate fin 19 (the inner tube corresponds to the plate).

The sensible heat of the reacted gas is transferred through the inner cylindrical tube wall with the aid of the above-described plate fin to the raw material gas flowing downward in the catalyst bed located outside the inner tube and consequently the temperature of the reacted gas is lowered and the reacted gas is discharged through an outlet 23 of the reactor.

The discharged reacted gas is transferred to the next step for use in desired applications such as a hydrogen electrode of a fuel cell, wherein the purity of hydrogen is enhanced usually by a carbon monoxide converter, a pressure swing adsorber or the like according to intended applications. Numeral 25 designates an opening for packing a catalyst in the reactor.

A burner 50 is provided on the hearth 41 in such a manner that a flame is directed to a ceramic heat equalizing plate 270 provided along the furnace wall. This prevents the flame of the burner from coming into direct contact with the reforming tube. Further, this can reduce or eliminate the space provided in the art for the prevention of contact of the flame with the reforming tube.

The heat equalizing plate 270 need not be gas-permeable. An insulating material 410 is provided between the heat equalizing plate 270 and the furnace frame which frame is generally made from steel. Representative examples of the insulating material 410 include refractory bricks and rock wools. The heat equalizing plate 270 heated by the burner gives a radiant heat to the reforming tube. A gas-permeable plate 27 is obliquely provided on the heat equalizing plate 270. This causes the gas-permeable plate 27 to be heated by the passage therethrough of high-temperature combustion waste gas. This enables the radiant heat to be returned to the side of the reforming tube more effectively than the case where the gas-permeable plate 27 is orthogonal to the reforming tube. In short, the gas-permeable plate 27 and heat equalizing plate 270 serving as a heat recovery radiant plate are provided on at least part (exclusive of the floor) of the circumference of the reforming tube for the purpose of effectively utilizing the radiant heat.

In order to effectively utilize the radiant heat of the combustion gas, the gas-permeable plate 27 is supported at its upper end by support means 29 positioned slightly above one half of the longitudinal length of the outer reactor tube in such a manner that the gas-permeable plate 27 surrounds the outer tube and partitions the space within the furnace 100 into upper and lower parts, the gas-permeable plate 27 extending obliquely downward so as to face the reaction tube at an angle of usually 20° to 60°, preferably 30° to 45°.

In a portion located below the gas-permeable plate 27 and surrounded by the heat equalizing plate 270, that is, a radiant heat transfer space 110, the transfer of the heat to the reactor tube is mainly effected by the radiant heat from the combustion gas. The combustion gas also gives its heat to the gas-permeable plate 27, so that the heat is returned to the side of the reactor tube by radiation from the plate 27 and contributes to heating of that portion of the reactor tube protruding downward from the gas-permeable plate 27.

The gas-permeable plate 27 may be made from any material as long as it is resistant to heat, permeable to gas and, as described above, can effectively return the heat to the radiant heat transfer space without causing any significant pressure loss. Although ceramic is usually employed as the material, at least part of the material may be a metallic material.

A nozzle for ejecting a high-temperature gas obtained in other high-temperature source may be substituted for the burner Such a high-temperature feed means is provided within or above the floor of the furnace (heating vessel) 100.

Although the temperature ofthe combustion gas which has passed through the gas-permeable wall has been reduced to a value insufficient to effect heat transfer by radiation the combustion gas still possesses substantial sensible heat. Therefore, in order to effectively utilize this remaining sensible heat of the combustion gas for preheating the raw material gas, the same heat transfer means as that described above, typically a plate fin 31, is metallurgically integrally joined or bonded to the outer surface of the reaction tube (corresponding to the plate). Since it is not necessary that a peripheral tube to the plate fin 31 contribute to the heat transfer, the peripheral tube may be one made by mere seaming.

The space within the heating vessel 100 located above the gas-permeable material is called a convection heat transfer space 120 as opposed to the radiant heat transfer space 110.

The vertical thickness ratio of both the heat transfer spaces is determined mainly by the temperature of the heat source gas.

The heat source gas may not only be one wherein the radiant heat transfer space of the heating vessel is used as a combustion furnace but also one wherein a gas, heated by a heat source which may utilize combustion outside the heating vessel, is introduced into the radiant heat transfer space through the utilization of a nozzle or the like, and blown against the heat equalizing plate and passing through the gas-permeable wall into the convection heat transfer space.

Numeral 33 designates an outlet for the combustion waste gas. Numerals 35, 37, 39 and 41 designate an insulating material, a steel section support, a partition cylinder in the double tube, and the bottom wall (floor-)of the furnace, respectively.

The partition cylinder 39 is provided for the purpose of preventing the catalyst packed within the annular space from entering the inner tube. In this embodiment, the partition cylinder 39 is fixed to the bottom 17 of the outer tube concentrically with the inner tube fixed in such a manner that it is mutually movable in the axial direction of the inner surface or outer surface of the inner tube. The partition cylinder is provided with a plurality of pores or openings, e.g. in the form of a mesh or tulle, between the lower end of the inner tube and the bottom of the outer tube, and the reacted gas is passed from the annular space through the mesh or tulle. Since the partition cylinder is fixed to the outer tube, a mutual displacement between the inner tube and the outer tube due to the differential thermal expansion or the like can easily be absorbed.

Figure 2C:
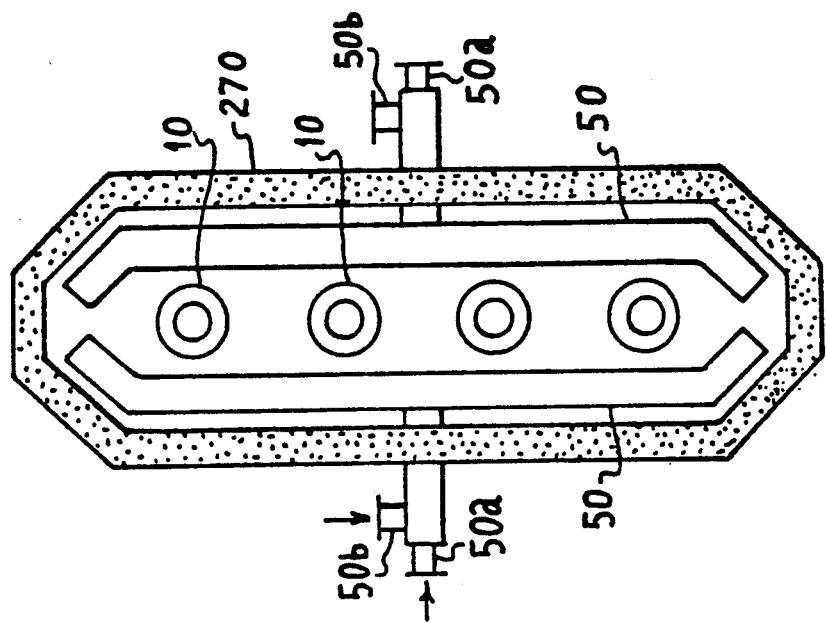
FIGS. 2b and 2c are cross-sectional views similar to FIG. 2a involving the use of linear burners.
Figure 2B:
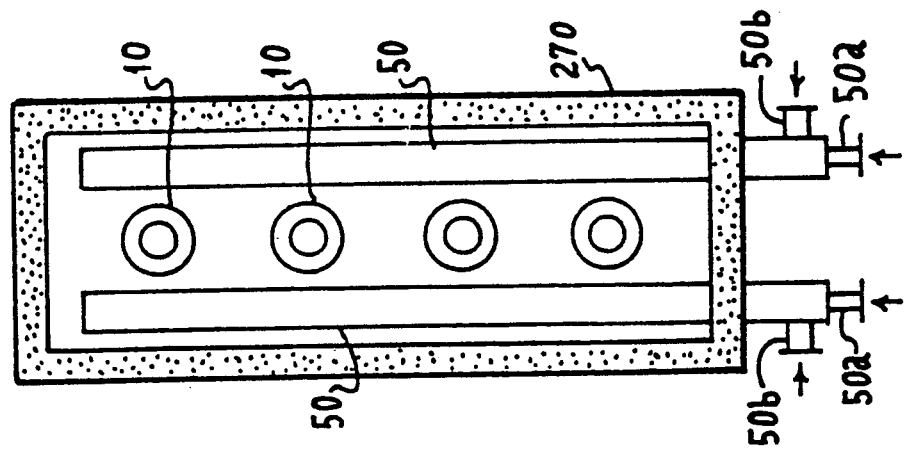
Figure 2A:
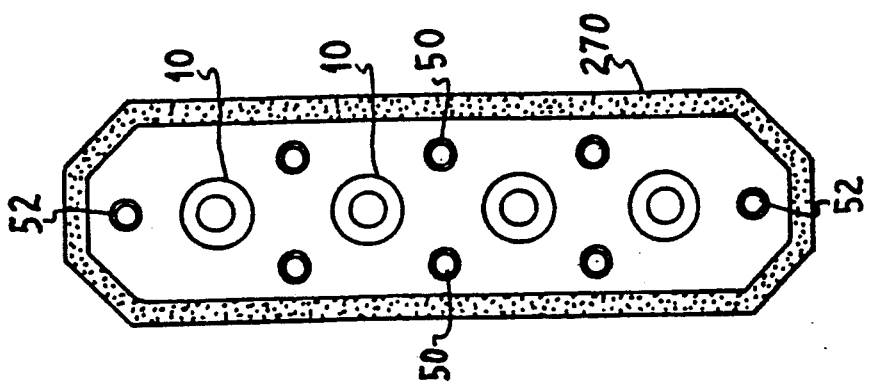
FIG. 2a is a cross-section taken on the line X—X of FIG. 1.

FIG. 2a is a cross-sectional view taken along line X—X of FIG. 1. A ceramic heat equalizing plate 270 is provided opposite to the double tubes 10 in such a manner that a row of the double tubes 10 is sandwiched or surrounded by the heat equalizing plate 270. The insulating material 410 (FIG. 1) provided in the rear of the heat equalizing plate and the frame made of an iron wall or the like are not shown in FIG. 2. A flame from a burner 50, for example, buried in the furnace floor 41 (FIG. 1) is applied to the heat equalizing plate 270. In general, the heat equalizing plate 270 is brought to a red-hot state and gives a radiant heat to the opposed reforming tubes. In this case, the tubes are linearly provided and the radiant heat equalizing plate is provided opposite to the reforming tubes, which enables the heat to be uniformly transferred to the tubes. That is, the portion which serves as the "shadow" is eliminated, so that the heating is effected uniformly, neither hot spot nor low-temperature portion is formed and the thermal stress in the tubes is relaxed. This is favourable from the viewpoint of the material and strength.

The heat source may be a conventional burner, and a plurality of burners may be provided usually in a linear form around the row of tubes 10 (see FIG. 2a). In this case, a burner 50 may be provided between each pair of adjacent tubes and at the end of the row. That is, in order to realize uniform heating of the end reactor tubes in the row, a burner 52 may be provided at each end of the row.

The use of a plurality of burners however results in the piping network for combustion air and fuel becoming complicated. Further, the separate provision of a combustion monitor (for example, a flame detector) makes it necessary to conduct a flow control of the necessary air and fuel, which increases the number of control points which are necessary, so that the reliability of the apparatus is often lowered. Because of this, the use of a linear burner as shown in FIG. 2b is preferred, a single fuel inlet 50a and a single air inlet 50b being provided for each linear burner. This simplifies the piping for the fuel and air and reduces the number of control points, which contributes to an improvement in the reliability. Furthermore, the ends of the linear burner may be extended along the end walls as shown in FIG. 2c, to effect more uniform heating of the end tubes in the row.

In the above-described burners, air or an oxygen-containing gas is fed into the outer tube while the fuel is fed into the inner tube. The fuel is injected into the outer tube through pores or a slit (not shown) in the inner burner tube wall, and the mixture of both the gases is ejected through pores or slits (not shown) in the outer tube wall towards the heat equalizing plate.

Figure 2D:
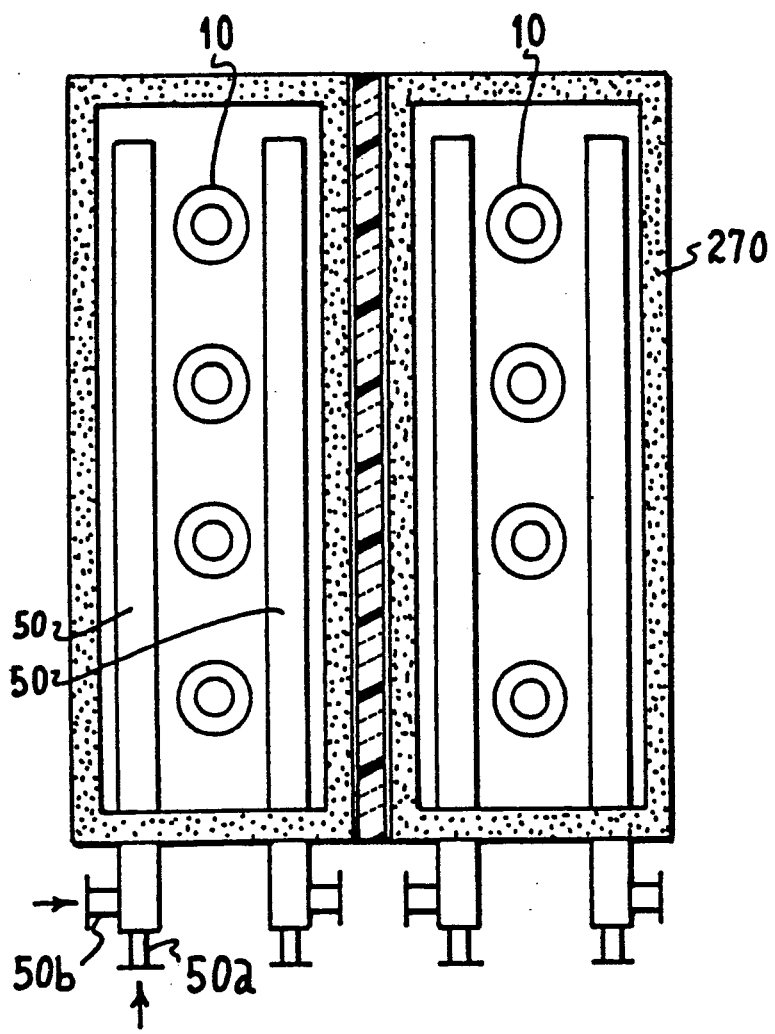
FIG. 2d is a cross-sectional view of adjacent units similar to that of FIG. 2b.
Figure 3A:
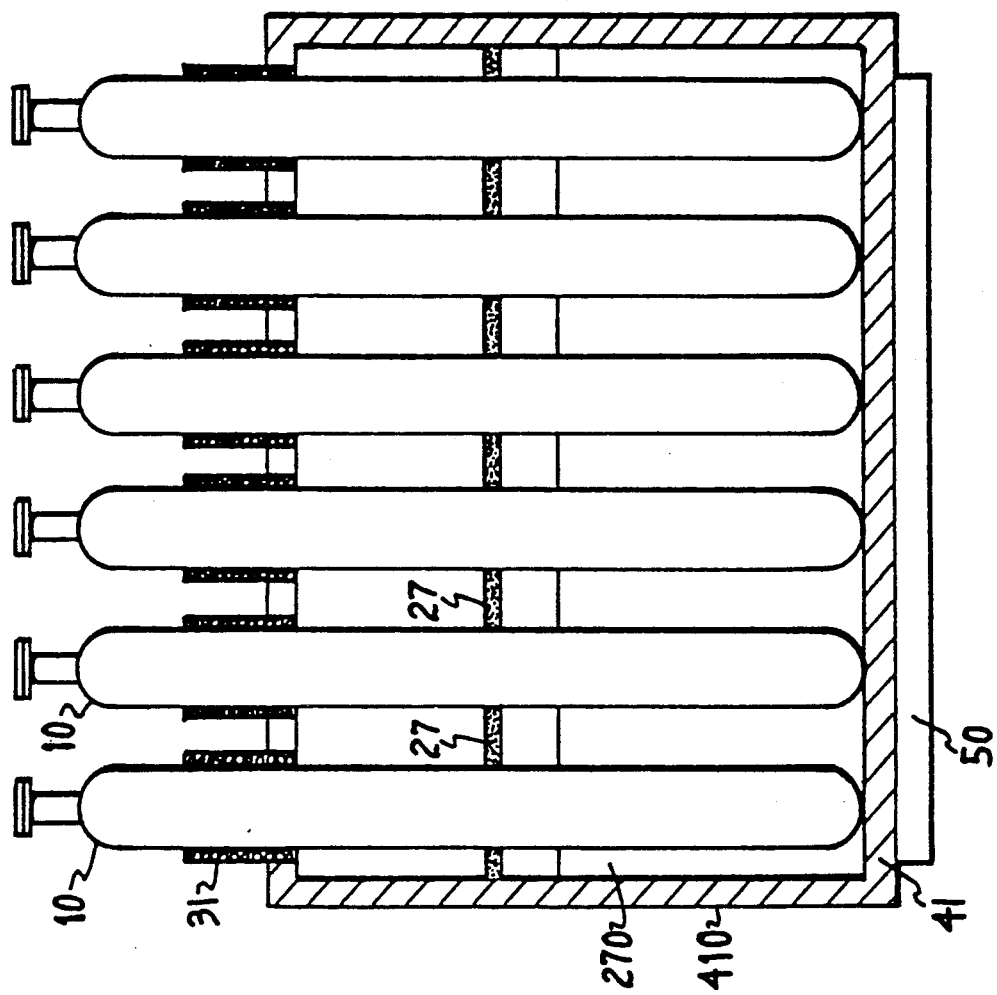
FIGS. 3a and 3b are schematic cross-sectional front and side views of one embodiment of the invention.
Figure 3B:
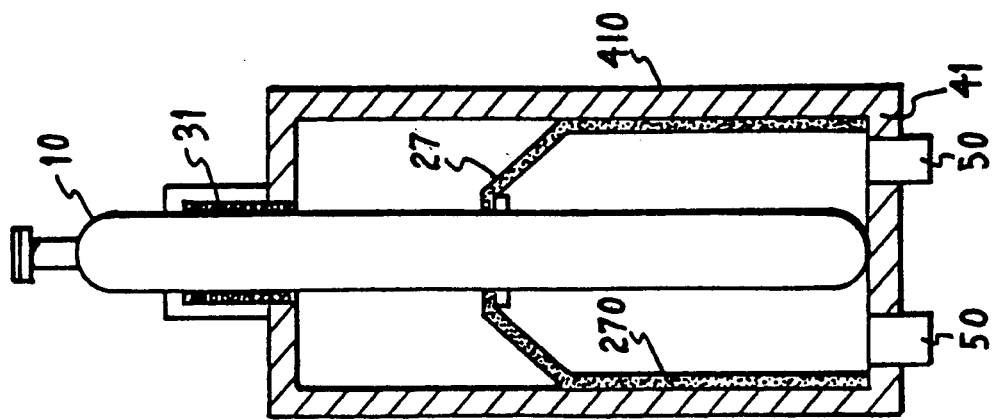

FIG. 2d shows an embodiment wherein apparatus units comprising a plurality of reforming tubes are arranged adjacent to each other for the purpose of coping with a large necessary capacity or a variation in the capacity. It is a matter of course that an increase in the number of the tubes can accommodate the increase in the capacity. In this case, however, the form of the furnace becomes flat. Even in such a case, the use of a linear burner as shown in FIG. 2b facilitates the design of the piping. Since the reforming tubes are linearly provided, it becomes easy to construct a group of headers for distributing the raw materials, reaction gas and combustion waste gas. This enables the upper space of the tubes to be made compact and, at the same time, the connection to the subsequent units becomes easy. An embodiment of the whole layout of the apparatus according to the present invention is shown in FIG. 3a (schematic cross-sectional view in front) and FIG. 3b (schematic cross-sectional view in side).

As shown in FIGS. 1 and 2, when the gas-permeable plate 27 and the heat equalizing plate 270 for utilizing the radiant heat are provided so as to surround a group of reforming tubes provided in the linear form, it is possible to effectively utilize the sensible heat of the combustion gas. Since a plate fin heat exchanger having a good heat transfer efficiency is used in the convection heat transfer space, the sensible heat of each of the reacted gas and combustion gas is effectively utilised.

As is apparent from the foregoing detailed description, the present invention provides an apparatus for catalytic reaction provided in a heating vessel, wherein use is made of a reforming tube wherein a heat recovery means, particularly a heat transfer means, such as a wave-shaped plate fin heat exchanger useful for increasing the heat transfer area, is provided on a necessary portion of the inner tube and/or outer tube of a cylindrical double tube of the apparatus for catalytic reaction, a radiant heat transfer space sandwiched or surrounded by a heat equalizing plate and having an upper end defined by an obliquely provided gas-permeable plate is provided, and a burner is provided at a reasonable position. By virtue of the above constitution of the present invention, the heat can be uniformly fed to the reforming tubes through the conversion of the heat of the combustion gas into a radiant heat, the sensible heat of each of the reacted gas and combustion gas can be effectively utilized, and it is possible to easily cope with an increase in the capacity of the apparatus, which contributes to an improvement in the heat exchange efficiency of the whole heating furnace and a reduction in the size of the reactor.

We claim:

1. An apparatus for catalytic reaction comprising a heating chamber having a hearth (41), side wall(s) and a roof (3), and inlet and an outlet for a heat source gas; a substantially vertically mounted concentric double cylindrical tubular reactor (1) mounted in said roof (3) and protruding into the space (100) within said heating chamber; a gas-permeable dividing means (27) which divides the space (100) within the heating chamber into an upper convection heat transfer space (120) and a lower radiant heat transfer space (110) and disposed such that a lower portion of the protruding tubular reactor is within the radiant heat transfer space (110) and an upper portion of the protruding tubular reactor is within the convection heat transfer space (120); said tubular reactor (1) having an outer cylindrical tube (9) and a concentric inner tube (11), a lower end of said outer tube (9) being closed and having an inlet (5) at an upper end of said outer tube for raw material gas communicating with an annular space (10) defined by said outer and inner tubes, said annular space packed with catalyst and communicating with a lower and open end of said inner tube (11), an upper end of said inner tube being closed from said outer tube and communicating with an outlet means (23) for said reactor (1); characterised in that a heat recovery means (19) is disposed in the upper end of said inner tube, which heat recovery means protrudes inwardly from the internal surface of said inner tube, in that said outlet from said heating chamber comprises an annular opening defined by the outer surface of the outer tube (9) and the surface of an opening in the roof (3) through which the reactor protrudes, in that a heat recovery means (31) is disposed in said annular opening, in that the gas-permeable dividing means (27) extends outwardly from the outer surface of said outer tube (9) and obliquely downwardly to meet the side wall(s) of said heating chamber and in that a heat equalizing layer (270) extends from the outer periphery of the gas-permeable dividing means (27) substantially vertically downwardly to the hearth (41) and the inlet (50) for said heat source gas are disposed in the hearth (41) such as to direct said heat source gas onto an inner surface of said heat equalizing layer.

2. An apparatus as claimed in claim 1, characterised in that the heat recovery means (19) protruding inwardly from the inner surface of said inner tube (11) comprises a plate fin disposed parallel to the inner surface of said inner tube and metallurgically integrally joined or bonded thereto.

3. An apparatus as claimed in claim 2, characterised in that the plate fin is in wave-shaped form.

4. An apparatus as claimed in claim 2, characterised in that the plate fin (19) is disposed in an annular space defined by the inner surface of said inner tube (11) and the outer surface of a cylindrical shell (21) closed at one end and mounted concentrically within said inner tube (11).

5. An apparatus as claimed in claim 1, characterised in that the heat recovery means (31) disposed in the opening of the heating chamber is a plate fin metallurgically integrally joined or bonded with the outer surface of the outer tube (9).

6. An apparatus as claimed in claim 1, characterised in that the gas-permeable dividing means (27) comprises a ceramic material.

7. An apparatus as claimed in claim 1, characterised in that inlet (50) for the heat source gas is associated with gas blowing means for blowing the heat source gas.

8. An apparatus as claimed in claim 1, in which said inlet for the heat source gas is a gas burner.

* * * * *

UNITED STATES PATENT AND TRADEMARK OFFICE
CERTIFICATE OF CORRECTION

PATENT NO. : 5 199 961
DATED : April 6, 1993
INVENTOR(S) : Kozo OHSAKI et al

It is certified that error appears in the above-identified patent and that said Letters Patent is hereby corrected as shown below:

Column 8, line 21; after "and" (first occurrence) insert ---an---.

Column 9, line 10; after "the" (second occurrence) insert ---annular---.

Signed and Sealed this

Eighth Day of February, 1994

BRUCE LEHMAN

Attest:

Attesting Officer

Commissioner of Patents and Trademarks